United States Patent Office 2,800,844
Patented July 30, 1957

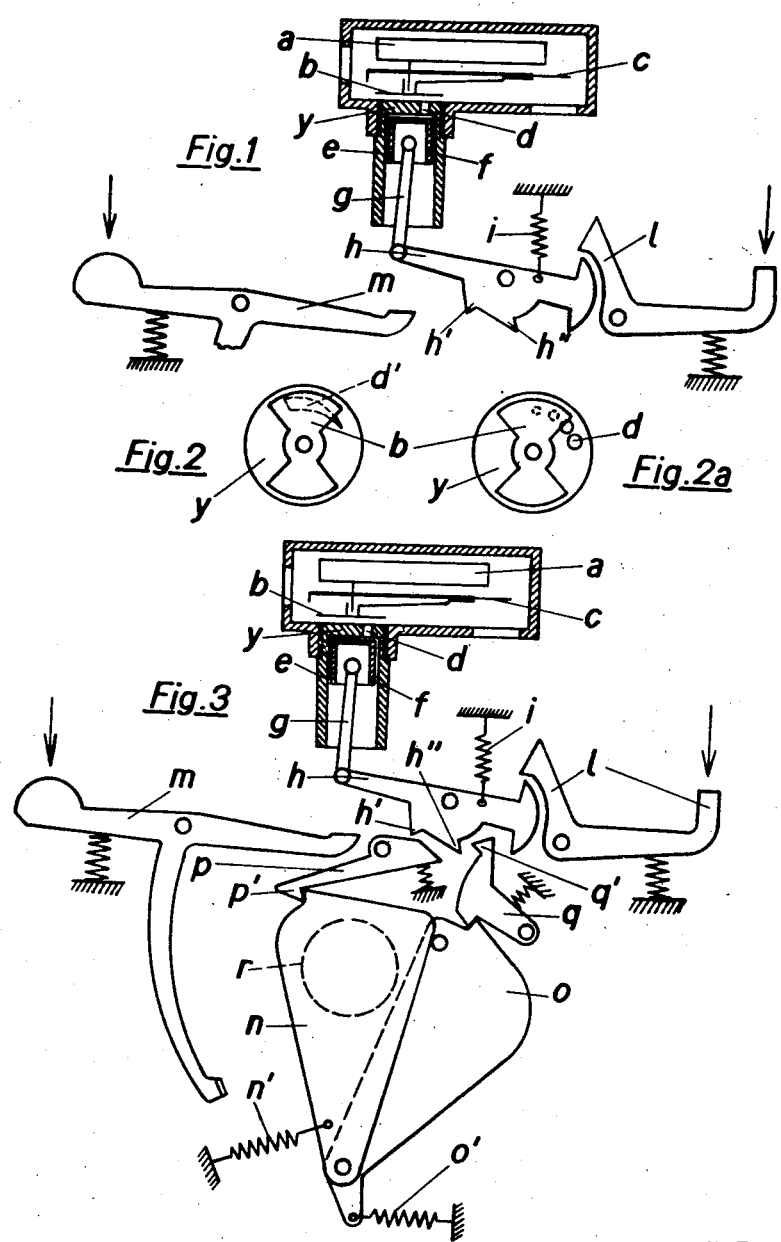

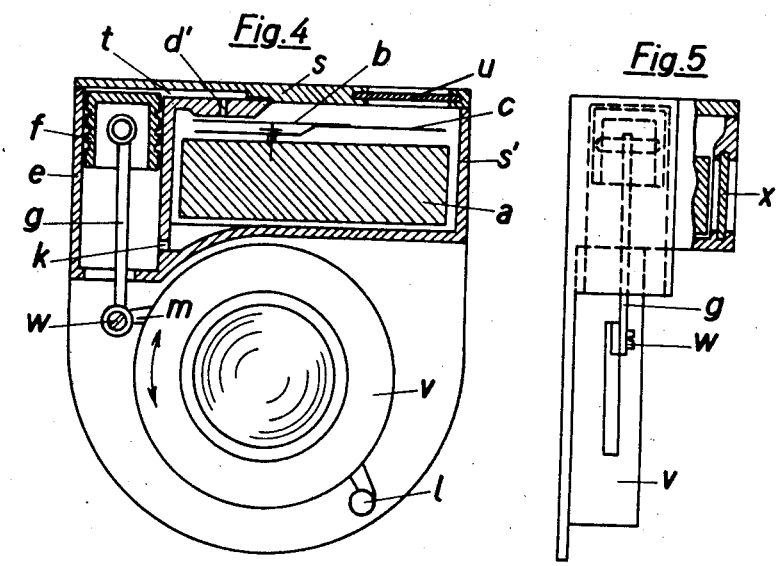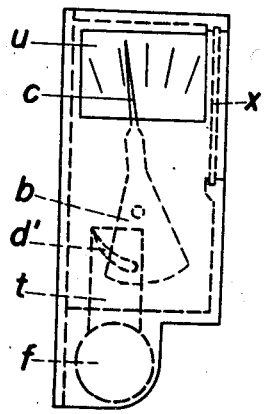

2,800,844

AUTOMATIC CONTROL FOR PHOTOGRAPHIC CAMERAS

Julius Durst and Gilbert Durst, Brixen, Italy, assignors to said Julius Durst and Gilbert Durst and to Durst A. G., Bozen, Italy, a corporation of Italy Application January 21, 1953, Serial No. 332,395

Claims priority, application Germany February 15, 1952

14 Claims. (Cl. 95—60)

This invention relates to photographic cameras and particularly, mechanisms for automatically inserting a time delay in the speed of the operation of the shutter in accordance with the ambient illumination. More specifically, the invention relates to a shutter speed control mechanism which is connected to be directly responsive to conventional galvanometer type light meters.

Various prior attempts have been made to automatically control the time of shutter actuation in accordance with the ambient illumination, as well as to control the opening in the lens diaphragm. The prior structure for performing these functions have all had little success in practical operation, and have employed methods which require the galvanometer indicator pointer to perform mechanical work, as for example, as a variable position stop for a moving feeler lever released by the shutter mechanism. This type of construction made it necessary to employ a suitable means for holding the fragile indicator of the galvanometer stationary during the initial instant of shutter release.

Other unsuccessful attempts have employed electromagnetic transmission devices in which the indicator pointer of the galvanometer cooperated with a series of sliding contacts. The friction in the sliding contacts renders such system doubtful in operation and difficult to maintain with a predetermined timed delay setting. Further, systems which require a relatively great output of work from the indicator pointer or other elements of the light-sensitive mechanism, are undesirable in view of the fact that the light-sensitive photoelectric cell of such devices produces an output current of only a few milliamps magnitude which is barely sufficient to drive the freely swinging indicator. As a consequence, no prior automatically controlled shutter mechanism has been completely successful in practical applications.

It is therefore a primary object of the instant invention to overcome the manifest inefficacies of these prior control structures for photographic cameras. It is a further object of the instant invention to provide a control mechanism which automatically functions to insert a predetermined time delay in the shutter opening movement, or alternately, may be connected to control the opening of the lens diaphragm depending upon the ambient illumination. These and other distinct objects will become apparent from the description and claims which follow.

Broadly, the instant invention comprises a light-sensitive control mechanism which is connected to the shutter mechanism of photographic or motion picture apparatus of any conventional type in such a manner that the time of exposure may be automatically controlled in a predetermined manner by a conventional photoelectric cell and indicating galvanometer.

In its most general form it is characterized in that a controlling element of the galvanometer regulates a fluid retarding mechanism which is activated through suction or pressure by means of graduated passage openings corresponding to the swing path of the galvanometer pointer, the fluid retarding mechanism in turn controlling the speed of the shutter release.

The new and essential feature of this device resides in the combination of a control element connected with the turning spool (i. e., indicating pointer) of the exposure meter, which moves over a wedge-shaped slit or a disc carrying a series of holes, and under the effect of suction or pressure, lies upon the slit or perforated disc in the manner of a valve, so that corresponding to the particular galvanometer indication, a greater or lesser part of the entire opening surface of the disc is covered and thereby the suction or pressure flow actuating the retarding mechanism is correspondingly increased or decreased.

The openings of the slit or perforated disc are chosen in their dimensions so that with the same diaphragm opening and with any desired (possible) position of the galvanometer indicator, a predetermined amount of light always reaches the photographic layer, as is in each case required for a correct exposure of the light-sensitive carrier on the photographic film. In other words, the product of the light intensity and the exposure duration remain constant in each case. This requires that the degree of time delay action by the fluid retarding mechanism be changed, corresponding to the amount of light that reaches the light-sensitive cell and thereby also the camera lens, and that the exposure duration, i. e., the duration of the shutter opening, be correspondingly regulated.

According to one form of the invention, there is combined with the freely swinging indication pointer of the galvanometer, a resilient leaf carried vertically to the plane of rotation of the galvanometer and which oscillates over a slit or perforated disc enclosing one side of the cylinder of a fluid retarding mechanism. The leaf is adapted to be drawn downwardly or upwardly as the case may be, upon this slit or perforated disc under the action of suction or pressure in the manner of a valve at the moment of shutter release; thereby corresponding to the position assumed by the galvanometer indicator at this moment of release to cover more or less of the total passage opening of the disc to correspondingly vary the amount of suction or pressure flow which passes through it.

If the diaphragm of the lens is adjusted to another larger or smaller opening then it is desirable to undertake coupled corresponding changes in the diaphragm in front of the photoelectric cell in a known manner, in order again to meet the requirement of a correct exposure of the photographic light-sensitive layer in the case of all positions of the lens diaphragm.

These changes which are necessary for the correct exposure of the photographic film are, according to the invention, set into operation through the above-described pneumatic time delay mechanism, wherein the speed of movement of the shutter releasing lever is slowed down or retarded by a dash-pot, which, in turn, has its speed of movement controlled by the total passageway opening area defined by the perforations or slits in the disc previously described, the disc in turn forming one part of the chamber wall of the dash-pot cylinder. The release lever conveys the time retarding imparted through the pneumatic delay mechanism to any conventional shutter structure, as for example, slit shutters, blade shutters, central shutters, etc.

Having broadly defined the invention, reference will now be made to the accompanying drawings in describing specific embodiments thereof, and in which:

Fig. 1 is an elevation view, partly in section, of the time delay mechanism according to the invention, Figs. 2 and 2a are top plan views of two forms, respectively, of valved fluid passageways for cooperation with the delay mechanism of the invention, Fig. 3 is a schematic view, partly in section, of the time delay mechanism of Fig. 1 as applied to the lever system of a blade type shutter mechanism, Fig. 4 is a front elevation view, partly in section, of a modified form of the invention, Fig. 5 is a side elevation view, partly in section, of the Fig. 4 modification, and Fig. 6 is a top plan view of the Fig. 4 modification.

In Fig. 1 a housing or container surrounds the galvanometer $a$ of a photoelectric exposure meter which is provided with a galvanometer pointer $c$. A disc $b$ is directly connected to the latter to follow its movements, and is constructed of a flexible material so as to be capable of resilient movement perpendicular to its plane of rotation. The disc $b$ may, for example, have the form illustrated by solid lines in Figs. 2 and 2a, and acts as a valve plate, and cooperates with the slit or perforated disc $y$ located opposite said plate at a small distance, so that the plate acts as the valve member and the disc represents the seat of the valve. The perforated disc $y$ forms the upper end wall of an enclosed cylinder $e$.

The aggregate so far described, namely, the arrangement of a resilient plate on the galvanometer pointer oriented in the direction of the axis of rotation, and the development of this resilient plate as a valve member in cooperation with an opposed slit or perforated disc is the paramount factor in the successful operation of the new shutter. Thereby a direct determination of the position of the galvanometer pointer is possible without it being necessary to clamp it fast or to strain its bearings.

The valve arrangement described is placed into operation by a pneumatic device actuated by the apparatus trip release lever $l$. In Fig. 1 the pneumatic device takes the form of a piston $f$ sliding within the cylinder $e$, through which the link $g$ and lever $h$ are actuated. The piston is normally held in the upper dead end position by means of the trip lever $l$ which locks the lever $h$ in its tensioned position. The tensioning lever $m$ is arranged to return the piston into its upper dead end position and thereby tension the entire system, particularly the spring $i$.

Fig. 3 illustrates the invention in connection with the essential components of a blade shutter mechanism including blades $n$ and $o$ and locking pawls $p$ and $q$, and wherein the time delay is provided by the suction pump itself. By pressing the tensioning lever $m$, the shutter blades $n$, $o$ are moved into the tensioned position where they are held immobile by the respective pawls $p$, $q$ which are held in engagement therewith by the pressure of biasing springs. With the mechanism so tensioned, actuation of the release lever $l$ trips the lever $h$ and the nose $h'$ on the lever presses upon the lever $p$ whose catch hook $p'$ releases the shutter blade $n$. The blade $n$ speeds into its position of rest under the effect of the spring $n'$. Meanwhile the lever $h$ continues its movement. The nose $h''$ strikes against the hook $q'$ and lifts the lever $q$; the shutter blade $o$ is then released and likewise speeds into the position of rest under the effect of the spring $o'$. Thus the time during which the shutter is open and therefore the exposure duration stand in direct proportion to the speed of movement of the piston of the fluid retarding device.

Figs. 4 to 6 show how the subject matter of the invention may be embodied in a central shutter type camera, said shutter having a moving member, which is characterized in that the exposure time provided by said shutter is a function of the speed of movement of said moving member. As described later, said member will be coupled with the fluid retarding mechanism. Especially said moving member of the central shutter will be the tensioning lever, which returns from its tensioning position to its rest position during the shutter operation, whereby the speed of said return movement of said tensioning lever varies inversely with the time during which the shutter is open. These central shutter types are well known per se. Reference is made, for example, to U. S. Letters Patent No. 2,211,355 in which one form of such shutter types is particularly described.

As shown in Fig. 4, a central shutter of the above-mentioned type is coupled with the fluid retarding mechanism. A housing $s$, $s'$ surrounds the galvanometer $a$ of the exposure meter, the piston $f$ and the piston rod $g$, and supports the photographic central shutter $v$. The shutter tensioning lever $m$ is connected with the piston rod $g$ by a suitable pivot pin, arbor, or the like which may be connected or disconnected as desired by means of a milled screw $w$, or the like. The manually operated releaser of the shutter is represented by $l$ and operates in a manner similar to that previously described in the Fig. 3 embodiment. The pointer $c$ of the exposure meter carries the valve plate $b$ which is positioned to extend a slight distance below the valve opening $d'$. The valve opening is connected with the chamber of the piston cylinder $e$ by means of an air passage $t$. The piston chamber also possesses at its lower end a compensating opening $k$, as well as a passageway opening for the piston rod $g$. Changes in the position of pointer $c$ under the effect of the photoelectric cell $x$ arranged at the front of the apparatus may be observed through the scale window $u$ located in the top of the exposure meter.

Of course, the fluid retarding mechanism corresponding to the above invention may also be applied to a so-called automatic shutter, also known per se.

As many apparently widely different embodiments of the invention may be made without departing from the spirit and scope thereof, it is to be understood that this invention is not limited, except as defined in the appended claims.

What is claimed is:

1. A control device for a photographic camera which automatically regulates the shutter exposure time in accordance with the ambient illumination as detected by a photoelectric exposure meter incorporating a movable galvanometer element, the shutter of said camera including a moving member characterized in that the exposure time provided by said shutter is a function of the speed of movement of said moving member, said control device comprising a fluid-operated retarding mechanism, regulating means for said retarding mechanism including a fluid passageway and a flow obstructing member movably arranged for varying the resultant obstructing effect upon the flow passing through said passageway, connecting means operatively coupling said moving member of said shutter to said fluid-operated retarding mechanism to permit said retarding mechanism to regulate the speed of movement of said moving member, and additional means operatively coupling said movable galvanometer element to said flow obstructing member for adjusting said flow obstructing member in accordance with the position of said movable galvanometer element to regulate the retarding effect of said retarding mechanism in accordance with the ambient illumination.

2. A control device as set forth in claim 1 wherein said moving member is the actuating lever of a two-bladed shutter mechanism, said actuating lever first releasing one of said blades to open said shutter and upon subsequent movement releasing the other of said blades to close said shutter.

3. A control device as set forth in claim 1 wherein said moving member is an appendage of the blade operating structure of a central type shutter and said exposure time provided by said shutter is a function of the speed of movement of said blade operating structure and said appendage.

4. A control device as set forth in claim 3 wherein said appendage is an actuating element of said central type shutter.

5. A control device as set forth in claim 1 wherein said fluid-operated retarding mechanism is a pneumatic mechanism.

6. A control device as set forth in claim 1 wherein the area of said passageway is shaped relative to the successive positions of said obstructing member to cause said retarding effect to vary as an inverse function of the ambient illumination detected by said photoelectric exposure meter.

7. A control device as set forth in claim 6 wherein said area of said fluid passageway is cusp shaped.

8. A control device as set forth in claim 6 wherein said fluid passageway is comprised of a plurality of separate passageways successively disposed in relation to the path of movement of said obstructing member.

9. A control device as set forth in claim 1 wherein the structure of said obstructing member is resilient to provide movement thereof in response to flow of fluid through said passageway.

10. A control device as set forth in claim 1 wherein said fluid-operated retarding mechanism is comprised of a cylinder and a piston, said cylinder includes said passageway, and said connecting means is a rod coupling said piston to said moving member of said shutter.

11. A control device as set forth in claim 9 wherein said retarding mechanism draws said obstructing member towards it by exerting suction upon it.

12. A control device as set forth in claim 9 wherein said retarding mechanism forces said obstructing member away from it by exerting a pressure upon it.

13. A control device as set forth in claim 1 wherein said flow obstructing member is formed as a blade pivotally arranged for angular movement adjacent to said passageway of said retarding mechanism and adapted to cover said passageway to a greater or lesser extent according to its angular position.

14. A control device as set forth in claim 10 wherein means are provided for disconnection of said rod and said moving member.

References Cited in the file of this patent

UNITED STATES PATENTS

| | | |
|---|---|---|
| 477,012 | Kords | June 14, 1892 |
| 906,862 | Byers | Dec. 15, 1908 |
| 2,187,953 | Schmidt | Jan. 23, 1940 |